(12) United States Patent
Pederson et al.

(10) Patent No.: US 8,005,687 B1
(45) Date of Patent: Aug. 23, 2011

(54) SYSTEM, METHOD AND COMPUTER PROGRAM PRODUCT FOR ESTIMATING MEDICAL COSTS

(75) Inventors: Derek C. Pederson, Lakeville, MN (US); Thomas E. Lynn, Chanhassen, MN (US)

(73) Assignee: Ingenix, Inc., Eden Prairie, MN (US)

( * ) Notice: Subject to any disclaimer, the term of this patent is extended or adjusted under 35 U.S.C. 154(b) by 1441 days.

(21) Appl. No.: 10/966,530

(22) Filed: Oct. 15, 2004

Related U.S. Application Data

(60) Provisional application No. 60/512,006, filed on Oct. 15, 2003.

(51) Int. Cl.
*G06Q 10/00* (2006.01)
*G06Q 50/00* (2006.01)
*A61B 5/00* (2006.01)
*G06F 19/00* (2011.01)

(52) U.S. Cl. .............................. 705/2; 705/3
(58) Field of Classification Search .................. 705/2–3
See application file for complete search history.

(56) References Cited

U.S. PATENT DOCUMENTS

| | | | | | |
|---|---|---|---|---|---|
| 5,845,254 | A | * | 12/1998 | Lockwood et al. | 705/2 |
| 5,915,241 | A | * | 6/1999 | Giannini | 705/2 |
| 6,061,657 | A | * | 5/2000 | Whiting-O'Keefe | 705/2 |
| 7,505,916 | B1 | * | 3/2009 | Adrian et al. | 705/4 |
| 2002/0147617 | A1 | * | 10/2002 | Schoenbaum et al. | 705/2 |

OTHER PUBLICATIONS

AHRQ (Agency for Healthcare Research and Quality), Ambulatory Surgery in U.S. Hospitals, 2003, www.ahrq.gov, www.ahrq.gov/data/hcup/factbk9/factbk9e.htm.*

* cited by examiner

*Primary Examiner* — Luke Gilligan
*Assistant Examiner* — Joy Chng
(74) *Attorney, Agent, or Firm* — Devan V. Padmanabhan; Dorsey & Whitney LLP

(57) ABSTRACT

Various embodiments for estimating a cost of a medical procedure. In one example, a method may include the operations of averaging data from various geographies of the amount billed to form a national average amount billed for the medical procedure; associating the average amount billed with one or more claim data items from a health plan; grouping the claim data items from the health plan using episode classes; calculating an average amount billed for each episode class; and adjusting the average amount billed for each episode class by a geographic adjustment factor to form an estimated cost of the medical procedure.

4 Claims, 14 Drawing Sheets

Treatment Cost Estimator

 Welcome to the Treatment Cost Estimator

This site shows you the average amount paid for health care in your area. Use this information to learn more about health care costs, discuss treatment options with your doctor, and decide what benefit plan makes sense for you.

100  Zip Code: [          ] (Go!)

(The zip code is used to show costs for health care in your area. For example, you can enter your home zip code, or the zip code of your doctor's office.)

IMPORTANT!
- DO NOT AVOID GETTING HEALTH CARE based on the cost information on this site.
- This site shows the average costs of health care. Your care may cost more, or it may cost less. The amount that you pay will depend on your employer's benefit plan as well as the decisions made by you and your doctor.
- For information on your benefit plan, such as co-pay amounts and covered procedures, look on myuhc.com or contact your benefit plan at the number listed on your medical ID card.

Fig. 4

Treatment Cost Estimator

MENU
- General Health
- Women's Health
- Men's Health
- Heart
- Cancer
- Injuries & Accidents
- Asthma & Lungs
- Diabetes & Glands
- Stomach & Digestive
- Skin
- Bones & Joints
- Eye, Ear, Nose & Throat
- Mental Health
- Brain, Spinal Cord, & Nerves
- Kidney & Bladder Zip Code: 80202     New Zip Code: [      ] (Go!)

TCE Home

Enter a word to find treatment costs for the medical condition or procedure that interests you. You may also select a topic on the left or a common condition or procedure listed below. — 114

Search for: [          ] (Search)

? Search hints

Diseases & Conditions
- Cancer, breast
- Diabetes, adult
- Ear Infection, acute
- Heart attack
- High blood pressure More...

Surgeries & Procedures
- Ear Tube placement
- Examination of knee with scope
- Heart bypass
- Normal birth
- Removal of uterus More...

Office Visits & Tests
- Blood Sugar Test, diagnostic
- EKG
- Mammogram
- Physical Exam
- X-Ray Of Knee More...

Using TCE

* DO NOT AVOID GETTING HEALTH CARE based on the cost information on this site.

* This is the average cost of health care in your area.

* These are estimated costs, and are NOT what you actually pay.

* Use this information to talk with your doctor.

* myuhc.com has more information about health care treatment and benefit plan information.

* If you can't find what you are looking for, see Search hints.

Treatment Cost Estimator

Zip Code: 80202    New Zip Code: [ ]   (Go!)

Search for:
[ ]
[Search]    Disease & Condition Summary
[?] Search hints

MENU
- General Health
- Women's Health
- Men's Health
- Heart
- Cancer
- Injuries & Accidents
- Asthma & Lungs
- Diabetes & Glands
- Stomach & Digestive
- Skin
- Bones & Joints
- Eye, Ear, Nose & Throat
- Mental Health
- Brain, Spinal Cord, & Nerves
- Kidney & Bladder

Diabetes, adult

Medical term: Diabetes, type 2
Description: Disease in which the body can not effectively use the sugar in the blood occurring in adults, not always requiring insulin

[?] Tell me more about this Disease or Condition

[?] Find a doctor

ⓘ Average Costs                                           122

These are average costs for 1 year of treatment.           124

|  | Average In-Network [?] | Average Out-of-Network [?] |
|---|---|---|
| Average Total Paid by Benefit Plan and Consumer | $1,556 (*) | $2,211 (*) |

Average paid by consumers: [?]
                                                                 126
No Health Insurance:              $2,211
Average In-Network:               $79 (*)      128
Average Out of Network:           $583 (*)     130

⚠ * The amount you pay depends on your benefit plan. Check your benefit plan to see what you pay.
   [?] View my benefit plan Average paid by benefit plans:

Average In-Network: $1,477 — 132

Average Out-of-Network: $1,628 — 134

Show what's included in these costs (e.g. Pharmacy, Surgery, Lab, etc.)

About these costs:

- Medical costs are very different from one person to another. For Diabetes, adult, the costs usually range from $984 - $2,211. Your costs may be outside these ranges based on how sick you are, the number of illnesses you have and the medical decisions made by you and your doctors.
  [?] Frequently Asked Questions about costs

 Related Surgeries & Procedures

The treatment for Diabetes, adult can include a number of medical or surgical procedures. The average costs above take this into consideration. Following is a list of common procedures, with an estimated percentage of the number of people who will need this procedure. Select a procedure to get more details about its costs.

Repair of blocked eye vessels        1%

visits)
Return to Summary page for Diabetes, adult

About these costs:

- Medical costs are very different from one person to another. For Diabetes, adult, the costs usually range from $984 - $2,211. Your costs may be outside these ranges based on how sick you are, the number of illnesses you have and the medical decisions made by you and your doctors.
   Frequently Asked Questions about costs

 Related Surgeries & Procedures

The treatment for Diabetes, adult can include a number of medical or surgical procedures. The average costs above take this into consideration. Following is a list of common procedures, with an estimated percentage of the number of people who will need this procedure. Select a procedure to get more details about its costs.

Repair of blocked eye vessels     1%

Average In-Network: $6,522
Average Out-of-Network: $8,744

Show what's included in these costs (e.g. Pharmacy, Surgery, Lab, etc.)

About these costs:

- Medical costs are very different from one person to another. For Normal birth, the costs usually range from $6,026 - $11,719. Your costs may be outside these ranges based on how sick you are, the number of illnesses you have and the medical decisions made by you and your doctors.
   Frequently Asked Questions about costs

 Related Diseases & Conditions

The Normal birth procedure can be used to treat a number of medical conditions. Following is a list of medical conditions related to this procedure, with an estimated percentage of the number of people with this condition who need this procedure. Select a condition to get more details about its costs.

Childbirth                                         75%

Fig. 8 (cont)

Treatment Cost Estimator

Search for:

Zip Code: 80202    New Zip Code: [      ] (Go!)

[Search]    Surgery & Procedure Costs by Type of Service

[?] Search hints

MENU
- General Health
- Women's Health
- Men's Health
- Heart
- Cancer
- Injuries & Accidents
- Asthma & Lungs
- Diabetes & Glands
- Stomach & Digestive
- Skin
- Bones & Joints
- Eye, Ear, Nose & Throat
- Mental Health
- Brain, Spinal Cord, & Nerves
- Kidney & Bladder

Normal birth

Medical term: Obstetrical Care
Description: Birth of a baby through the vaginal canal

[?] Tell me more about this Surgery or Procedure
[?] Find a doctor (i) Types of service included in costs

These costs reflect a single procedure with its associated costs (for example, surgery usually involves expenses such as a hospital stay and lab tests. This example gives the breakdown of total billed charges.

| Type of Service | Average In-Network [?] | Average Out-of-Network [?] |
|---|---|---|
| Lab | $63 | $126 |
| Medical/Professional | $312 | $608 |
| Other | $117 | $217 |
| Radiology | $32 | $78 |
| Room & Board | $3,049 | $5,763 |
| Surgery (Incl. Anesthesia) | $3,403 | $4,927 |
| Average Total Paid by Benefit Plan and Consumer | $6,977 (*) | $11,719 (*) |

172 · · · 174 · · · 176
170

⚠ * The amount you pay depends on your benefit plan. Check your benefit plan to see what you pay.
[?] View my benefit plan

Fig. 9

Show specific services and costs (e.g. x-rays, tests and office visits)

Return to Summary page for Normal birth

About these costs:

- Medical costs are very different from one person to another. For Normal birth, the costs usually range from $6,026 - $11,719. Your costs may be outside these ranges based on how sick you are, the number of illnesses you have and the medical decisions made by you and your doctors.

 Frequently Asked Questions about costs

 Related Diseases & Conditions

The Normal birth procedure can be used to treat a number of medical conditions. Following is a list of medical conditions related to this procedure, with an estimated percentage of the number of people with this condition who need this procedure. Select a condition to get more details about its costs.

Childbirth                                    75%

TCE Front-end Database Design

SYSTEM, METHOD AND COMPUTER PROGRAM PRODUCT FOR ESTIMATING MEDICAL COSTS

CROSS REFERENCE TO RELATED APPLICATION

This application claims the benefit under 35 U.S.C. §119(e) to U.S. Provisional Application No. 60/512,006 entitled "SYSTEM, METHOD AND COMPUTER PROGRAM PRODUCT FOR ESTIMATING MEDICAL COSTS," filed Oct. 15, 2003, the disclosure of which is hereby incorporated by reference in its entirety.

FIELD OF THE INVENTION

This invention relates, in general, to methods for estimating costs associated with health care and medical services.

BACKGROUND OF THE INVENTION

Consumers of medical procedures or services often receive or undergo various services or procedures for healthcare without necessarily being aware of the potential costs of such healthcare services. As recognized by the present inventors, a potential patient may have a need for obtaining an estimate for various healthcare procedures or medical services that the potential patient is considering or will be faced with. For instance, some medical plans give employees a fixed amount of money which the employee may use for healthcare (i.e., $1,000 per year), and if the employee is likely to spend that amount of money or more in a year, then the employer may provide the employee with an option to join the company's medical plan if the employees pays a portion of the cost of the medical plan.

As recognized by the present inventors, in such a situation it would be beneficial to provide the employee with estimates of the cost of treatment of diseases, medical conditions, surgeries, procedures, office visits, tests, or the like—in a simple graphical user interface that a user (i.e., a consumer) can easily use.

Accordingly, as recognized by the present inventors, what is needed is a system and method for providing estimates of costs for various medical procedures, as well as various graphical user interfaces for displaying information related thereto.

It is against this background that various embodiments of the present invention were developed.

SUMMARY OF THE INVENTION

In light of the above and according to one broad aspect of one embodiment of the invention, disclosed herein is a system and method for providing estimates of costs for various medical procedures, as well as various graphical user interfaces for displaying information related thereto.

According to one broad aspect of one embodiment of the present invention, disclosed herein is a method for estimating a cost of a medical procedure. In one example, the method may include the operations of averaging data from various geographies of the amount billed to form a national average amount billed for the medical procedure; associating the average amount billed with one or more claim data items from a health plan; grouping the claim data items from the health plan using episode classes; calculating an average amount billed for each episode class; and adjusting the average amount billed for each episode class by a geographic adjustment factor to form an estimated cost of the medical procedure.

In one example, the operation of averaging data from various geographies of the amount billed may include reading data from an MDR database. The operation of averaging data from various geographies of the amount billed may also include reading CPT codes and associated data from an MDR database for all geographic regions represented in the MDR database, and for each CPT code, calculating an average amount billed using the associated data from all geographic regions represented in the MDR database.

In one embodiment, the operation of grouping the claim data items may include associating an episode code with each claim data item, wherein the episode code is selected from one or more clinical care codes, procedure codes, or services codes. The operation of calculating an average amount billed for each episode class may include identifying each claim data item having a particular episode code; and calculating an average amount billed based on the data associated with each claim data item for each episode code.

In one example, the operation of adjusting the average amount billed may include multiplying the average amount billed for each episode class by the geographic adjustment factor. The method may also include displaying the estimated cost to a user, or providing a graphical user interface having a display of the estimated cost. The method may also include obtaining an input from a user relating to a geographic region, wherein the input is used in the adjusting operation.

According to another broad aspect of another embodiment of the present invention, disclosed herein is an estimator for estimating a cost of a medical procedure. In one example, an estimator—which may be implemented as a device or as a software module or computer program running on a computer or a server or other device—may include an input for receiving one or more pieces of financial data relating to empirical costs for a plurality of medical services; an input for receiving one or more pieces of health plan claim data; an input for receiving a geographic region of interest; and an input for receiving a query for an estimate of the medical procedure.

In one example, the one or more pieces of financial data relating to empirical costs for the plurality of medical services may include amounts billed by medical professional for each of the plurality of medical services across different geographic regions. In another example, the one or more pieces of financial data relating to empirical costs for the plurality of medical services may include amounts collected by medical professional for each of the plurality of medical services across different geographic regions.

According to another broad aspect of another embodiment of the present invention, disclosed herein is a method for estimating a cost of a medical procedure. In one embodiment, the method may include providing for averaging data from various geographies of the amount billed to form a national average amount billed for the medical procedure; providing for associating the average amount billed with one or more claim data items from a health plan; providing for grouping the claim data items from the health plan using episode classes; providing for calculating an average amount billed for each episode class; and providing for adjusting the average amount billed for each episode class by a geographic adjustment factor to form an estimated cost of the medical procedure.

In one example, the operation of averaging data from various geographies of the amount billed may include providing for reading data from an MDR database. The operation of averaging data from various geographies of the amount billed may include providing for reading CPT codes and associated data from an MDR database for all geographic regions represented in the MDR database, and for each CPT code, providing for calculating an average amount billed using the associated data from all geographic regions represented in the MDR database. The operation of grouping the claim data items may include providing for associating an episode code with each claim data item, wherein the episode code is selected from one or more clinical care codes, procedure codes, or services codes. The operation of calculating an average amount billed for each episode class may include providing for identifying each claim data item having a particular episode code; and providing for calculating an average amount billed based on the data associated with each claim data item for each episode code.

In another example, the operation of adjusting the average amount billed may include providing for multiplying the average amount billed for each episode class by the geographic adjustment factor. The method may include providing for displaying the estimated cost to a user, and providing for a graphical user interface having a display of the estimated cost. The method may also include providing for obtaining an input from a user relating to a geographic region, wherein the input is used in the adjusting operation.

According to another broad aspect of another embodiment of the present invention, disclosed herein is a computer program product. In one example, the computer program product may include a computer useable medium and computer readable code embodied on the computer useable medium for causing an estimation of a cost of a medical procedure, the computer readable code including computer readable program code devices configured to cause the computer to effect an averaging data from various geographies of the amount billed to form a national average amount billed for the medical procedure; computer readable program code devices configured to cause the computer to effect an associating the average amount billed with one or more claim data items from a health plan; computer readable program code devices configured to cause the computer to effect a grouping the claim data items from the health plan using episode classes; computer readable program code devices configured to cause the computer to effect a calculating an average amount billed for each episode class; and computer readable program code devices configured to cause the computer to effect an adjusting the average amount billed for each episode class by a geographic adjustment factor to form an estimated cost of the medical procedure.

Other embodiments of the invention are disclosed herein. The foregoing and other features, utilities and advantages of various embodiments of the invention will be apparent from the following more particular description of the various embodiments of the invention as illustrated in the accompanying drawings and claims.

BRIEF DESCRIPTION OF THE DRAWINGS

FIG. 4 illustrates an example display screen of a graphical user interface for entry of a zip code, in accordance with an embodiment of the present invention.

FIG. 5 illustrates an example display screen of a graphical user interface providing for requesting a cost estimate for a disease, condition, surgery, office visit, or test, in accordance with an embodiment of the present invention.

FIG. 6 illustrates an example display screen of a graphical user interface providing for display of a cost estimate, including costs if the service is provided within a plan network or outside of a plan network, in accordance with an embodiment of the present invention.

FIG. 9 illustrates another example display screen of a graphical user interface providing for display of a cost estimate, including a listing of services associated with the estimate, if the services are provided within a plan network or outside of a plan network, in accordance with an embodiment of the present invention.

DETAILED DESCRIPTION

Disclosed herein is a system and method for providing estimates of costs for various medical procedures, as well as various graphical user interfaces for displaying information related thereto. Various embodiments of the present invention are described herein.

Figure 1:
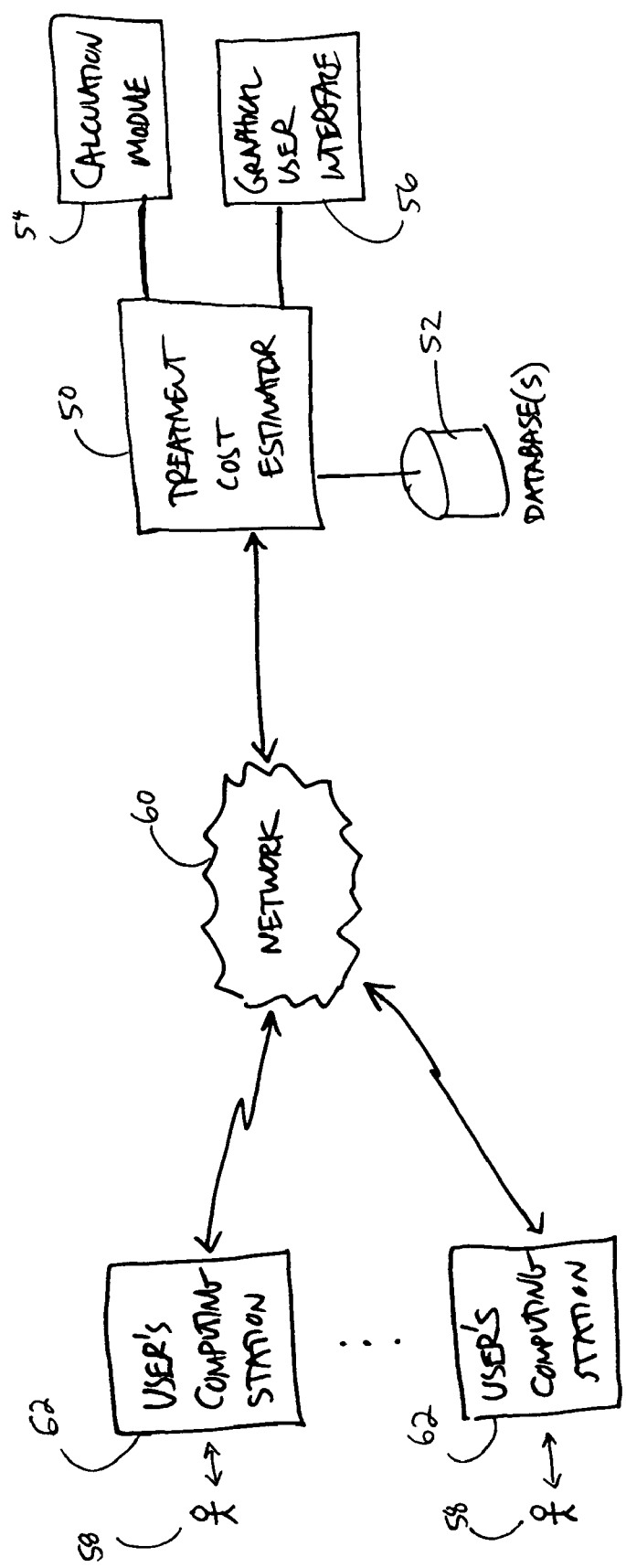
FIG. 1 illustrates an example of a block diagram of a treatment cost estimator application accessible to users over a network, in accordance with one embodiment of the present invention.

Referring to FIG. 1, an estimator 50 for estimating healthcare or medical treatment costs is illustrated in accordance with an embodiment of the present invention. As shown in FIG. 1, the treatment cost estimator 50 may be provided as a computer program (i.e., an application program) or hardware device accessing one or more databases 52 for calculating or estimating healthcare or medical treatment costs. A calculation module 54 may be provided as part of or in communication with the treatment cost estimator 50, wherein the calculation module 54 performs one or more of various operations described herein for calculating estimates of costs associated with healthcare or medical treatments. A graphical user interface 56, having one or more display screens, may also be provided or in communication with the treatment cost estimator application 50, wherein the graphical user interface 56 provides users 58 with the ability to input data necessary for the calculation module 54 to calculate estimates, as well as provides users 58 with various displays of the resulting data.

Preferably, the estimator application 50 is accessible over a network 60, such as the Internet or any other conventional network including but not limited to Ethernets, wired or wireless networks or links, virtual private networks, or the like, for users 58 to access the treatment cost estimator application program 50 and to view the results produced thereby. In one example, a user's computing station 62 is equipped with a browser program, such as Microsoft's Internet Explorer™, Netscape's Navigator™, a Linux browser, or other browsing application program, viewing program or other software, which provides the user 58 with access to the treatment cost estimator application program 50. The user's computing station 62 may be any conventional computing device or process, such as but not limited to a computer, personal data assistant (PDA), mobile phone, wireless device, tablet computer, terminal, or the like.

In another embodiment, the network 60 may be part of a company's intranet network wherein employees 58 access a treatment cost estimator program 50 through the company's intranet 60 in order to obtain estimates for medical treatment costs or healthcare costs.

Figure 2:
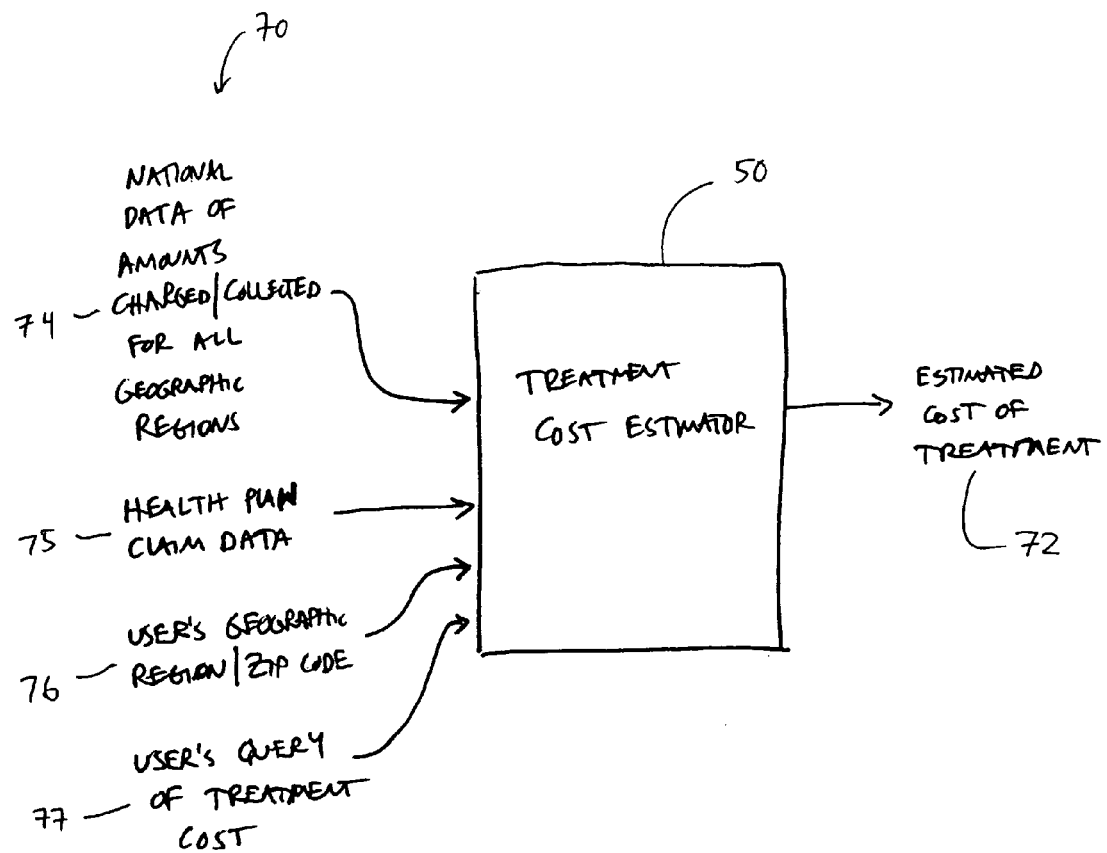
FIG. 2 illustrates a block diagram of a treatment cost estimator for providing estimated costs of treatments based on various input data, in accordance with one embodiment of the present invention.

FIG. 2 illustrates a block diagram of a treatment cost estimator 50, in accordance with an embodiment of the present invention. As shown in FIG. 2, an estimator program or module 50 may include a plurality of inputs 70 used by the estimator 50 for calculating estimates 72 of various costs of various medical or healthcare treatments. In one example, an estimator 50 receives data 74 from various geographic regions of a country, such as the United States, of amounts charged by medical professionals and amounts collected by medical professionals for various, different medical procedures, and may include such charges and amounts collected based on whether the charges/amounts were related to services provided within a healthcare plan or network or outside of a plan or network, and may also include co-pay data or other financial information. In one example, such data 74 is obtained from a "MDR" database which includes empirical data from approximately 300 geographic areas of the United States, relating to approximately 15,000 CPT codes for services, the data 74 including the amounts billed by medical professionals and the amounts paid for each service. The American Medical Association's CPT code is generally a procedure code with a description of the procedure performed along with an identifying code for reporting a medical service. Preferably, the most recent version of the MDR database is used to account for cost increases by health care providers.

Another input 75 may include health plan claim data, which may include various claim line items that a particular health plan has experienced over, for instance, the last 12 months, 24 months, or other time period. For instance, if a particular company subscribes to a particular health plan, then preferably, in one example, the treatment costs estimator 50 receives the health plan claim data 75 from the health plan subscribed to by the company so that employees of the company can obtain cost estimates based, in part, on the claim data 75 from the health plan. In one example, the claim data may be based on actual, empirical data from claims processed by a health plan, thereby reflecting any trends experienced by the particular health plan.

The estimator 50 of FIG. 2 will also receive, as an input 76, a geographic region or zip code. In one example, the estimator 50 queries a user for a geographic region or zip code, so that the estimator 50 can account for the geographic region in which the user lives or in which the medical services will be rendered (i.e., the location of the doctor's office). In this way, the estimator 50 is able to compensate or account for higher or lower medical costs in various regions throughout the nation. In one example, three digits (i.e., the leading 3 digits) of the zip code 76 may be used to map the input location with approximately 300 geographic regions of the United States.

The estimator 50 may also receive, as an input 77, a query from the user as to the particular treatment the user seeks an estimate for. In one example, a user may select from various diseases, conditions, surgeries, procedures, services, office visits, and tests and select therefrom an estimate of the desired healthcare service.

The estimator 50, based upon one or more of the inputs 70 shown in FIG. 2, provides an estimated cost 72 of the treatment sought by the user. In one example, the estimated cost 72 may be expressed in a yearly cost (or other increment or other time period) of the treatment, either as provided within the user's healthcare network or out of the user's healthcare network, and may also include such data as an estimated amount paid by the consumer, an estimated amount paid by the benefit plan, and/or a total amount for the treatment.

Figure 3:
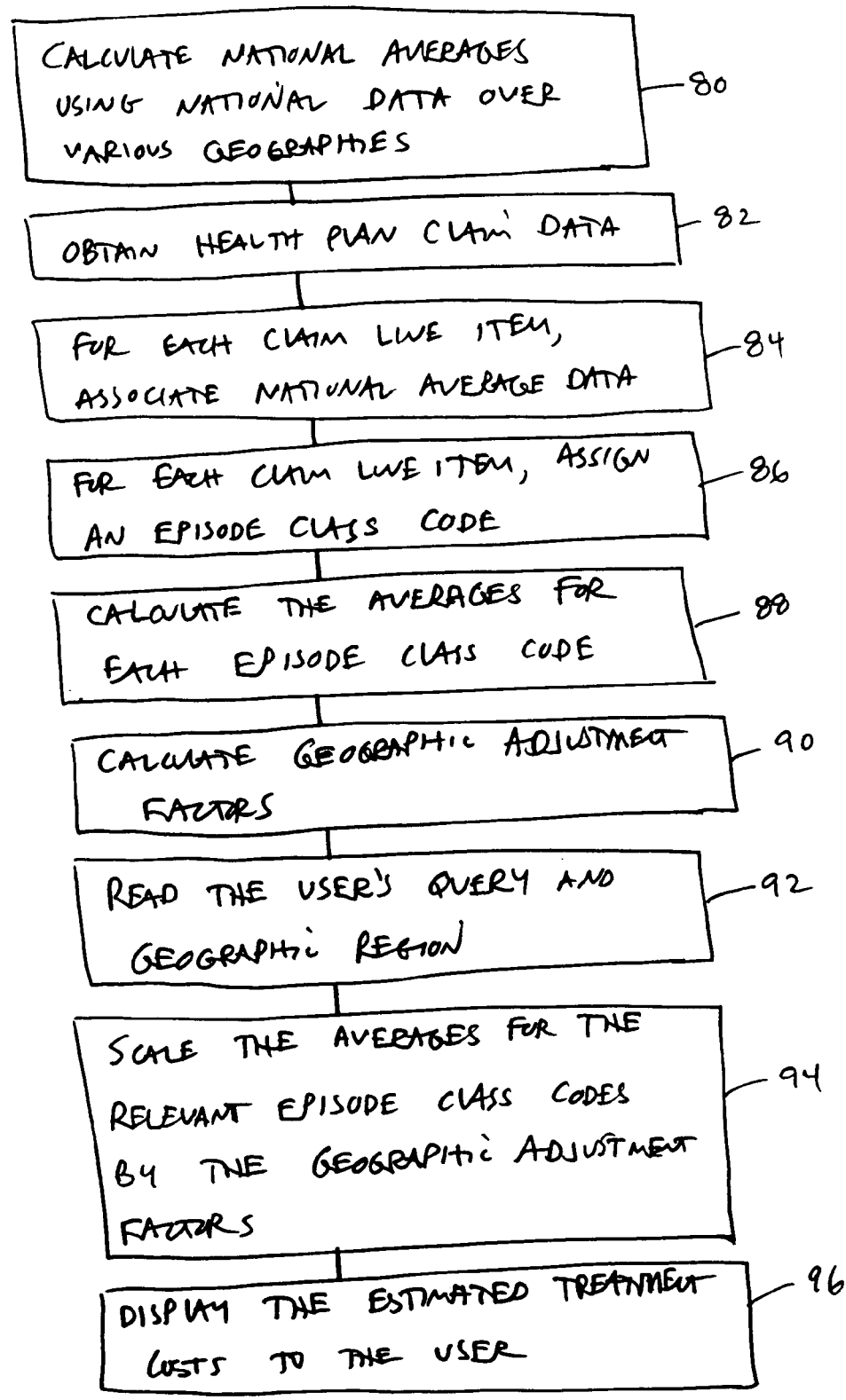
FIG. 3 illustrates an example of logical operations for calculating and displaying estimates of treatment costs, in accordance with one embodiment of the present invention.

In FIG. 3, an example of logical operations for calculating estimates of medical or healthcare treatments is illustrated, in accordance with an embodiment of the present invention. At operation 80, national data from various geographies is utilized to calculate national averages for various medical services or procedures. In one example, data from a "MDR" database is obtained including approximately 15,000 CPT codes and an amount billed and an amount paid for each code over 300 different geographic regions in the United States.

In one example, operation 80 takes the 50th percentile of all geographic codes for each CPT code and averages them, thereby forming a national average for the particular medical service or procedure associated with the CPT code. In one example, the result of operation 80 produces, for each CPT code, one national average for the amount billed for the respective CPT code, and one national average for the amount paid for each CPT code. As there may be approximately 15,000 CPT codes in the MDR database, then in one example, operation 80 produces approximately 30,000 averages. It is understood that the number of CPT codes in the MDR database is provided by way of example only, and that the data from which a national average is calculated by operation 80 may vary and include more or less than 15,000 CPT codes. For instance, operation 80 may calculate national averages using other databases or other data models, such as from Prevailing Healthcare Charge System or other individual or proprietary databases.

At operation 82, health plan claim data is obtained. In one example, a particular health plan includes multiple claim line items including a procedure code description, such as a CPT code, for each claim line item. The data may also include ICD-9 codes, which are an International Classification of Disease indicating why a particular procedure or medical service was performed, also known as a "diagnosis" codes.

The health plan claim data generally includes or is drawn from data provided by the health plan relevant to the particular cost estimate being provided. For instance, if an employer offers two different health plans each serviced by a different health plan provider, then operation 82 will access health plan claim data from a first provider if a user desires to obtain an estimate for a service relative to the first provider, or operation 82 may access health plan claim data from a second provider if the user is interested in obtaining estimates relative to a second healthcare provider.

At operation 84, for each claim line item obtained from the health plan claim data at operation 82, the national average obtained by operation 80 is associated with the particular claim line item. In one example, operation 84 reads the CPT code associated with a particular claim line item of the health plan claim data of operation 82 and looks up the national average amount billed and national average amount collected as calculated by operation 80 for the respective CPT code. Operation 84 may then associate these national averages for each claim line item. Hence, by virtue of operations 80-84, a data set may be produced which includes a plurality of claim line items from a health plan, CPT or procedure codes associated with each line item, and a national average dollar amount for the amount billed and the amount collected, these averages extracted from the averages calculated by operation 80.

At operation 86, for each line item in the data set produced by operation 84, an episode class code is assigned to each line item. In one example, claims data is transformed into episodes that associate all medical services, procedures and costs associated with a particular disease, condition, surgery, or procedure.

In one example, episode class codes may be sub-divided or grouped into classes or codes. For instance, episode class codes may include codes for conditions or diseases related to clinical care (e.g., high cholesterol, sprained ankle, etc.), codes for procedures (e.g., knee arthroscopy, colonoscopy, etc.), and codes for services, office visits and tests (i.e., X-ray of elbow, cat scan of brain, cancer cell test, etc.).

In one example, episode class codes may be assigned or associated with particular line items utilizing one or more of the methodologies described in commonly owned U.S. Pat. No. 6,223,164, the disclosure of which is hereby incorporated by reference in its entirety.

Various examples of episode class codes are listed in Appendix A, attached hereto. It is understood that the episode class codes listed in the Appendix are provided by way of example only and that other episode codes could be used in various implementations of the invention, and accordingly, these examples do not limit the scope of the invention.

At operation 88, the averages for each episode class code in the data set of operation 86 are calculated. In one example, for each line item in the data set of operation 86, all line items falling within a particular episode class type are tagged with or assigned to an episode class code. In effect, operation 88 groups the various line items of the data set into certain groups based upon their episode classes. In one example, an episode class includes an episode of a disease or condition, and may be based upon the CPT codes and/or the ICD-9 codes associated with a particular line item. In one example, each line item is associated into or with one episode class code.

Hence, at this point, the data set may be viewed as having a plurality of instances of various episode class codes, wherein each instance of an episode class code is a line item from operation 86. Preferably, operation 88 counts the number of instances of an episode class code, and calculates an average of the amount billed and the amount collected by telling the number of instances of a particular episode class code and calculating the average thereof. In one example, adjustments may be made for outliers for the conditions and procedures episode codes to adjust for high utilization.

Accordingly, in one example, operation 88 provides a data set that includes various episode class codes, each with an average amount billed and an average collected. The resulting database includes national average amount billed and national average collected for each episode class code.

At operation 90, geographic adjustment factors are calculated by identifying and using a market basket of the most common medical services to compare the relativity of a national average to each geographic area. In one example, a market basket of services are selected, which includes the average national billed and average national paid, and are re-priced at each of the approximately 300 zip codes (in one example, based on the first 3 digits of the zip code). In one example, the weighted-average market basket factors, based on the utilization associated with each medical service included in the market basket, are then calculated for the following types of service: anesthesia, radiology, laboratory, surgery, medical/professional, emergency, room & board, other.

At operation 92, the user's query and the user's geographic region are read. In one example, an estimator provides the user with the ability to select or request an estimate for a particular medical procedure or service, and operation 92 reads this data input by the user.

Episode codes, descriptions thereof, or information related to episodes may be used as an index so that the user can request a cost estimate for a particular medical service, procedure, disease or condition treatment, etc. In one example, episode codes, descriptions thereof, or information related to episodes, are displayed to a user through a graphical user interface (i.e., through a menu, list, links, hyperlinks, or other arrangement), so that the user can select or request a cost estimate related thereto. In one example, which episode codes/descriptions to display are determined by looking at combination of utilization and cost per unit for a commercial health plan. In another example, the episode codes, descriptions thereof, or information related to episodes, may be searched by the user with keywords or other conventional searching methods so that the user can use the results of the search to request an estimate of costs.

Further, the user also may enter or identify the user's geographic region from which the user desires the estimate to be based upon. In one example, the user enters a zip code, and the zip code is read and processed.

At operation 94, the averages for the relevant episode class codes are scaled, multiplied, or adjusted by the geographic adjustment factors of operation 92. Hence, the cost estimate for the particular service requested by the user has now been calculated.

At operation 96, the estimated treatment cost is displayed to the user. In one example, the estimated cost may be displayed to the user in terms of a yearly cost (or with other time frames, such as per incidence, per visit, per month, per number of years) of the treatment, either as provided within the user's healthcare network or out of the user's healthcare network, and may also include such data as an estimated amount paid by the consumer, an estimated amount paid by the benefit plan, and/or a total amount for the treatment.

It is understood that the order of operations shown in FIG. 3 could be changed if desired. For instance, a regional health care provider could perform one or more of the operations in FIG. 3 to calculate or derive a data set for the geographic regions of interest to the regional health care provider, and provide users with access to this data set for obtaining cost estimates within these regions.

FIGS. 4-9 relate to various examples of display screens which may be provided as part of a graphical-user interface, in accordance with an embodiment of the present invention. In FIG. 4, a prompt 100 is provided for a user to enter a zip code in order to identify the geographic region in which the user desires to obtain estimates of health care costs. The zip code, for example, may include the user's home zip code or may include the zip code of the user's doctor's office, in one example.

In FIG. 5, a graphical-user interface 110 is provided where a user may choose links 112 relating to a plurality of different diseases, conditions, surgeries, procedures, office visits, or tests that the user desires to obtain estimates for. Alternatively, the user may perform a word search using text box 114 to locate a medical condition, procedure, or service of interest. In FIG. 5, the graphical-user interface 110 is provided with a plurality of links 112 which the user may select to obtain estimates of treatment costs associated with the particular links.

For example, FIGS. 6-9 relate to particular examples of estimates that a treatment cost estimator may provide in accordance with an embodiment of the present invention. In FIG. 6, assuming the user has requested an estimate for the treatment costs associated with adult diabetes, then a display screen 120 of a graphical-user interface such as FIG. 6 may be provided. In one example, the graphical-user interface 120 of FIG. 6 includes an average total cost field 122 for one year of treatment assuming that the services are provided within the network of the user's medical plan, and a separate estimate field 124 is provided if the treatment is provided out of network of the user's medical plan.

In another embodiment, fields 126-128 show the averages paid by consumers may be displayed, including a field 126 for consumers having no health insurance, a field 128 for consumers having health insurance and utilizing services within a health care plan network, and a field 130 for averages paid by consumers utilizing services out of the network. In another example, field 132 may be provided for displaying the averages paid by benefit plans for services rendered within the plan network, and field 134 for outside of the plan network.

Figure 7:
FIG. 7 illustrates an example display screen of a graphical user interface providing for display of a cost estimate, including a listing of services associated with the estimate, if the services are provided within a plan network or outside of a plan network, in accordance with an embodiment of the present invention.

In FIG. 7, a display screen 140 may be provided for displaying the cost estimates based on the type of services included in the estimate. For example, for an estimate of one year of treatment costs for adult diabetes, a display screen may be provided with a plurality of fields 142 describing the types of services associated with the particular treatment, and an average or estimate of the costs associated with the services rendered within the plan network 144, or outside of the plan network 146. In FIG. 7, the totals 148, 150 of the services in and out of network are also shown.

Figure 8:
FIG. 8 illustrates another example display screen of a graphical user interface providing for display of a cost estimate, including costs if the service is provided within a plan network or outside of a plan network, in accordance with an embodiment of the present invention.

FIGS. 8-9 illustrate another example of display screens 160, 170 that may be utilized in accordance with embodiments of the present invention. In FIG. 8, for a medical procedure of "normal birth," estimates 162, 164 are provided if the procedure is provided within the plan network, and if the procedure is performed out of the plan network. Further, fields 166, 168, 169 may be provided to display the costs estimates of the amounts paid by consumers without health insurance, with health insurance within the plan network, and with health insurance outside of the plan network. In FIG. 9, the services 172 associated with the "normal birth" procedure are listed, and the estimates 174, 176 of the costs associated with each of these services within the plan network and outside of the plan network, are also displayed in this example.

Figure 10:
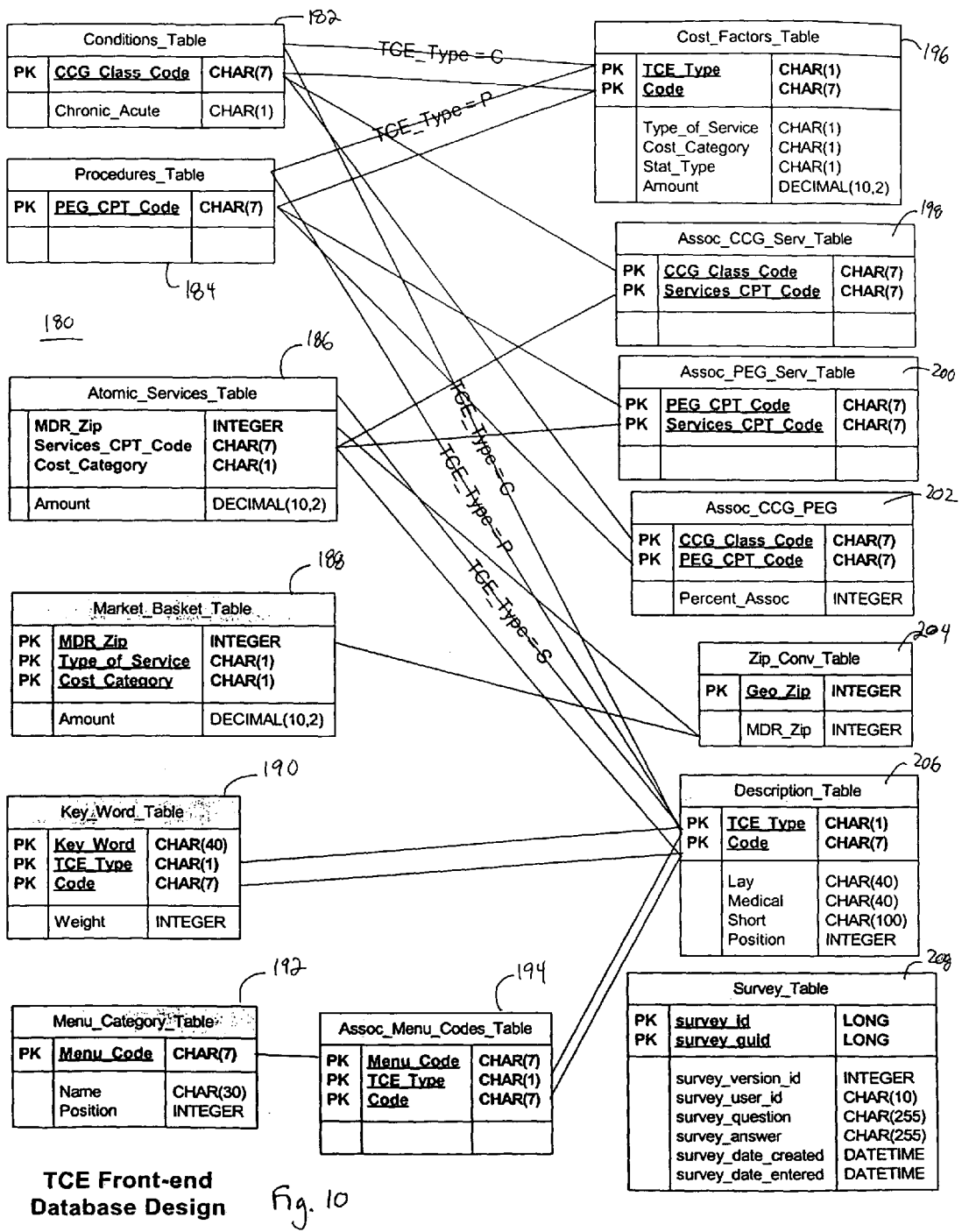
FIG. 10 illustrates an example of a database schema which may be used in accordance with an embodiment of the present invention.

FIG. 10 illustrates an example of a data base schema 180 which may be used in accordance with the embodiment of the present invention. As shown in FIG. 10, various tables may be used to organize the data for calculating estimates. For example, a conditions table 182 may be provided for disease and condition cost estimates; a procedures table 184 may be provided for surgery and procedure cost estimates; an atomic services table 186 may be provided for individual medical service costs; a market basket table 188 may be provided for adjusting national average amounts stored in a cost factors table; a keyword table 190 may be provided for searching for topics within a graphical user interface or software application; a menu category table 192 may be provided for organizing topics in a graphical user interface; an associate menu code table 194 may be provided for organizing diseases, conditions, surgeries, procedures, and atomic services relative to one another; a costs factor table 196 may be provided for maintaining the national averages for each disease, condition, surgery, procedure, and atomic service; an associate CCG's (clinical care groups, which are episode codes) services table 198 may be provided for identifying atomic services associated with a disease or condition; an associate PEG's (procedure event groups, which are episode codes) services table 200 may be provided for identifying atomic services associated with a surgery or procedure; an associate CCG/PEG services table 202 may be provided for maintaining a relationship between diseases and conditions, and surgeries and procedures; a zip code conversion table 204 may be provided for translate zip codes input by end users to a geographic area; a description table 206 may be provided for providing greater consumer friendly or layman's definitions for diseases, conditions, surgeries, procedures, and atomic services; and a survey table 208 may be provided for auditing user of the application and the users satisfaction with it. It is understood that FIG. 10 is provided by way of example only, and that implementations of embodiments of the invention may or may not use similar database arrangements or tables.

Hence, it can be seen that embodiments of the present invention provide a user with the ability to obtain estimates for the costs of various medical and health care procedures and services.

Embodiments of the invention can be embodied in a computer program product. It will be understood that a computer program product including features of the present invention may be created in a computer usable medium (such as a CD-ROM or other medium) having computer readable code embodied therein. The computer usable medium preferably contains a number of computer readable program code devices configured to cause a computer to affect the various functions required to carry out the invention, as herein described.

While FIG. 1 shows an estimator 50 as an application program running on a network 60, it is understood that embodiments of the invention could be implemented as a stand-alone software application running on a stand alone computing device (i.e., computer, PDA, etc.), a hardware device, or using other implementations.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

It should be appreciated that reference throughout this specification to "one embodiment" or "an embodiment" or "one example" or "an example" means that a particular feature, structure or characteristic described in connection with the embodiment may be included in at least one embodiment of the present invention. Therefore, it should be appreciated that two or more references to "an embodiment" or "one embodiment" or "an alternative embodiment" or "one example" and "an example" in various portions of this specification are not necessarily all referring to the same embodiment. Furthermore, the particular features, structures or characteristics may be combined as desired in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed inventions require more features than are expressly recited in each claim. Rather, as the following claims reflect, inventive aspects lie in less than all features of a single foregoing disclosed embodiment, and each embodiment described herein may contain more than one inventive feature.

While the invention has been particularly shown and described with reference to embodiments thereof, it will be understood by those skilled in the art that various other changes in the form and details may be made without departing from the spirit and scope of the invention.

What is claimed is:

1. A computer-implemented method for estimating medical treatment costs, comprising:
   storing medical service cost data from a plurality of geographic regions and at least one health plan provider in an electronic database, wherein the stored medical service cost data comprises:
      a plurality of episode class codes, wherein each episode class code is associated with an episode of care that includes all medical services associated with a particular disease, condition, procedure, or test; and
      an average amount billed by health care providers and an average amount collected by healthcare providers for each episode class code under one or more health plans provided by the at least one health plan provider, wherein the average amount billed and collected for each episode class code are respectively the summed average amount billed and summed average amount collected for all medical services in the associated episode of care;
   storing a geographic adjustment factor for each of the plurality of geographic regions in the electronic database, wherein the geographic adjustment factor for each region is calculated based upon relative utilization of a plurality of selected common medical services in each of the plurality of geographic regions;
   using a computer processor programmed to:
      receive an electronic query input by a user via a computerized input device, wherein the query includes a geographical region and a selection by the user of a disease, medical condition, procedure, or test;
      identify the stored episode class code associated with the selected disease, medical condition, procedure or test;
      retrieve from the stored average medical service cost data the average amount billed and average amount collected for the identified episode class code;
      adjust the retrieved average amount collected and the average amount billed for the identified episode class code using the stored geographic adjustment factor corresponding to the geographic region input by the user to generate an adjusted average amount collected and an adjusted amount billed for the selected disease, medical condition, procedure or test; and
      estimate a user medical treatment cost for the selected disease, medical condition, procedure or test using the adjusted average amount billed and the adjusted average amount collected; and
   displaying on an electronic user interface the estimated user medical treatment cost for the selected disease, medical condition, procedure or test.

2. The method of claim 1, wherein the displayed estimated user medical treatment cost further includes a list of medical service types associated with the selected disease, medical condition, procedure or test and a cost associated with each listed medical service type.

3. The method of claim 1, wherein the estimated user medical treatment cost represents estimated user medical treatment costs occurring within a defined time period.

4. The method of claim 1, wherein the displayed estimated user medical treatment costs include estimated user medical treatment costs for insured patients using in-network healthcare providers, insured patients using out-of-network healthcare providers, and uninsured patients.

* * * * *